(12) United States Patent
Wang et al.

(10) Patent No.: US 10,446,030 B1
(45) Date of Patent: Oct. 15, 2019

(54) COORDINATED PARKING-MONITORING SYSTEM

(71) Applicants: WenSheng Wang, Singapore (SG); Guobiao Zhang, Corvallis, OR (US)

(72) Inventors: WenSheng Wang, Singapore (SG); Guobiao Zhang, Corvallis, OR (US)

(73) Assignees: HangZhou HaiCun Information Technology Co., Ltd., HangZhou, ZheJiang (CN); Guobiao Zhang, Corvallis, OR (US)

( * ) Notice: Subject to any disclaimer, the term of this patent is extended or adjusted under 35 U.S.C. 154(b) by 0 days.

(21) Appl. No.: 15/949,032

(22) Filed: Apr. 9, 2018

(51) Int. Cl.
  *G08G 1/14* (2006.01)
  *G06K 9/00* (2006.01)
  *G08G 1/065* (2006.01)

(52) U.S. Cl.
  CPC ......... *G08G 1/148* (2013.01); *G06K 9/00771* (2013.01); *G08G 1/065* (2013.01); *G08G 1/147* (2013.01)

(58) Field of Classification Search
  CPC ........ G08G 1/065; G08G 1/147; G08G 1/148; G06K 9/00771
  USPC ....................................... 340/932.2
  See application file for complete search history.

(56) References Cited

U.S. PATENT DOCUMENTS

| | | | | |
|---|---|---|---|---|
| 2013/0266190 A1* | 10/2013 | Wang | ................... | G06K 9/3258 382/105 |
| 2014/0015981 A1* | 1/2014 | Dietl | ........................ | H04N 7/18 348/159 |
| 2015/0086071 A1* | 3/2015 | Wu | ........................ | G06T 15/205 382/103 |
| 2016/0286122 A1* | 9/2016 | Snavely | ............. | H04N 5/23238 |

* cited by examiner

*Primary Examiner* — Steven Lim
*Assistant Examiner* — Mancil Littlejohn, Jr.

(57) ABSTRACT

The present invention discloses a coordinated parking-monitoring system. A co-monitored parking space is monitored by at least two parking-monitoring devices. Its effective parking-monitoring area is substantially more than that if it were monitored by a single parking-monitoring device. This lowers the overall system cost.

5 Claims, 7 Drawing Sheets

COORDINATED PARKING-MONITORING SYSTEM

BACKGROUND

1. Technical Field of the Invention

The present invention relates to the field of electronics, and more particularly, to a parking-monitoring system.

2. Prior Arts

Locating a vacant parking space causes much frustration to motorists. It increases fuel consumption and has a negative impact to the environment. To conserve energy resources and enhance the quality of the environment, it is highly desired to develop a parking-monitoring system, which can transmit substantially real-time parking occupancy data to motorists. Based on the parking occupancy data, a motorist can be guided towards a vacant parking space at destination.

Parking enforcement is an important aspect of city management. The current parking-enforcement system is patrol-based, i.e. parking enforcement officers patrol the streets and/or parking lots to enforce the parking regulations. This operation requires significant amount of man power and also consumes a lot of fuel. It is highly desired to take advantage of the above-mentioned parking-monitoring system and automatically measure the parking time for each monitored parking space.

Both parking monitoring and enforcement are based on the detection of parked vehicles (i.e. parking detection). Because it can monitor a large number of parking spaces simultaneously, a camera is an ideal device for parking detection. Prior arts disclose many camera-based parking-monitoring systems. FIG. 1A discloses a cross-sectional view of a camera-based parking-monitoring system. A parking-monitoring device $25a$ captures the images of the parking spaces $05d$ . . . along the curb $20a$ of the street $20$. It is mounted on a support $21a$ such as an utility pole or a street-lamp post, which also provides power to the device $25a$.

FIG. 1B discloses a top view of the camera-based parking-monitoring system. In prior arts, each parking space is monitored by a single parking-monitoring device. Due to its finite view angle $22a$ (limited by a right edge $23a$ and a left edge $24a$), the parking-monitoring device $25a$ can monitor a finite number (a total of seven in this example) of parking spaces $05a, 05b \ldots 05g$. These parking spaces $05a$-$05g$ form a monitored group $30A$ for the parking-monitoring device $25a$. Likewise, an adjacent parking-monitoring device $25b$ monitors seven parking spaces $05h, 05i \ldots$, which form a monitored group $30B$. In prior arts, there is no overlap between the monitored groups $30A$ and $30B$.

FIG. 1C discloses more details of the parking spaces $05g$, $05h$ near the border between the monitored groups $30A$ and $30B$. When a vehicle is parked in the parking space $05g$, it will occlude a portion of its adjacent parking space $05h$ from the perspective of the parking-monitoring device $25a$. Out of the total parking area (denoted by "ABCD") of the parking space $05h$, only the shaded portion (denoted by "EBCF") is an effective area which can be used for parking monitoring (i.e. effective parking-monitoring area). When its effective parking-monitoring area ratio, i.e. the ratio between the effective parking-monitoring area ("EBCF") and the total parking area ("ABCD"), is below a parking-determination threshold (e.g. 70%), the effectiveness of the parking-monitoring device $25a$ to monitor the parking space $05h$ becomes questionable. As a result, the parking space $05g$ becomes the rightmost parking space that can be monitored by the parking-monitoring device $25a$. Line $23a$ becomes the right edge of the view angle $22a$, which bounds the monitor group $30A$ of the parking-monitoring device $25a$.

The prior-art parking-monitoring system is an un-coordinated parking-monitoring system: each parking-monitoring device works by itself and there is no coordination among them. As a result, the parking spaces that can be monitored by each parking-monitoring device are limited. This increases the total system cost.

OBJECTS AND ADVANTAGES

It is a principle object of the present invention to conserve energy resources and enhance the quality of the environment.

It is a further object of the present invention to lower the overall system cost of a parking-monitoring system.

It is a further object of the present invention to increase the number of parking spaces that can be monitored by each parking-monitoring device.

In accordance with these and other objects of the present invention, a coordinated parking-monitoring system is disclosed.

SUMMARY OF THE INVENTION

The present invention discloses a coordinated parking-monitoring system. Different from prior arts where each parking-monitoring device works by itself and each parking space is monitored by a single parking-monitoring device, at least a parking space is monitored by at least two parking-monitoring devices. This parking space is referred to as a co-monitored parking space. The effective parking-monitoring area of the co-monitored parking space is substantially more than that if it were monitored by a single parking-monitoring device. As a result, the number of parking space that can be monitored by a parking-monitoring device increases (e.g. from seven to eight). This helps to lower the overall system cost.

Figure 1A:
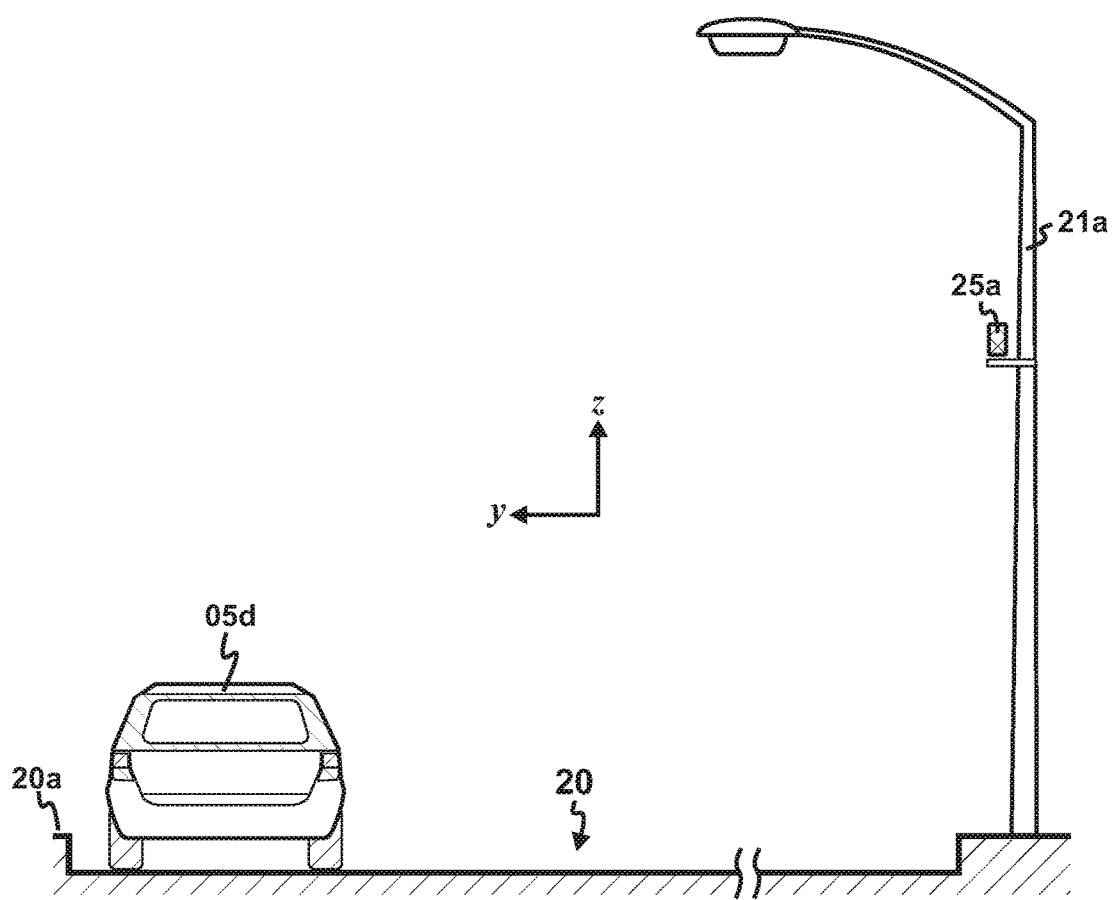
FIG. 1A is a cross-sectional view of a city street monitored by a parking-monitoring device.

It should be noted that all the drawings are schematic and not drawn to scale. Relative dimensions and proportions of parts of the device structures in the figures have been shown exaggerated or reduced in size for the sake of clarity and convenience in the drawings. The same reference symbols are generally used to refer to corresponding or similar features in the different embodiments.

DETAILED DESCRIPTION OF THE PREFERRED EMBODIMENTS

Those of ordinary skills in the art will realize that the following description of the present invention is illustrative only and is not intended to be in any way limiting. Other embodiments of the invention will readily suggest themselves to such skilled persons from an examination of the within disclosure.

Figure 1B:
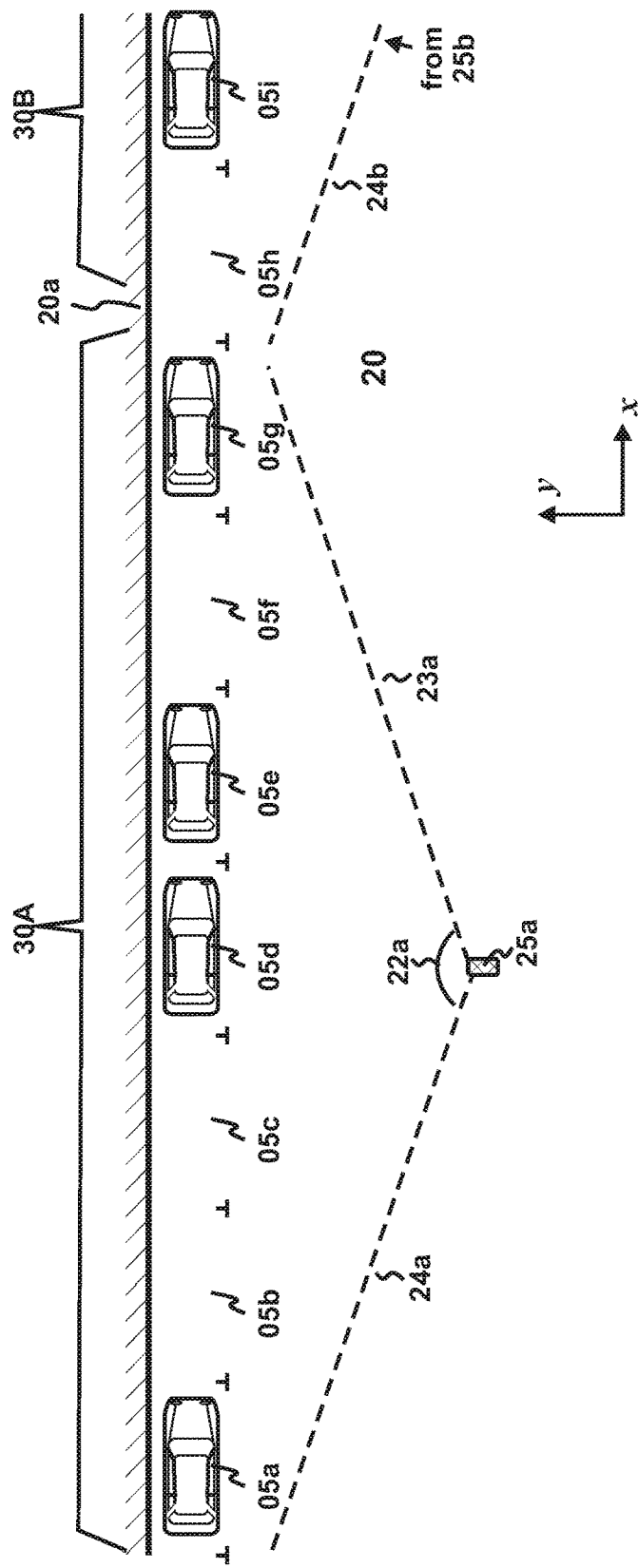
FIG. 1B is a top view of the city street monitored by an un-coordinated parking-monitoring system (prior art)
Figure 2A:
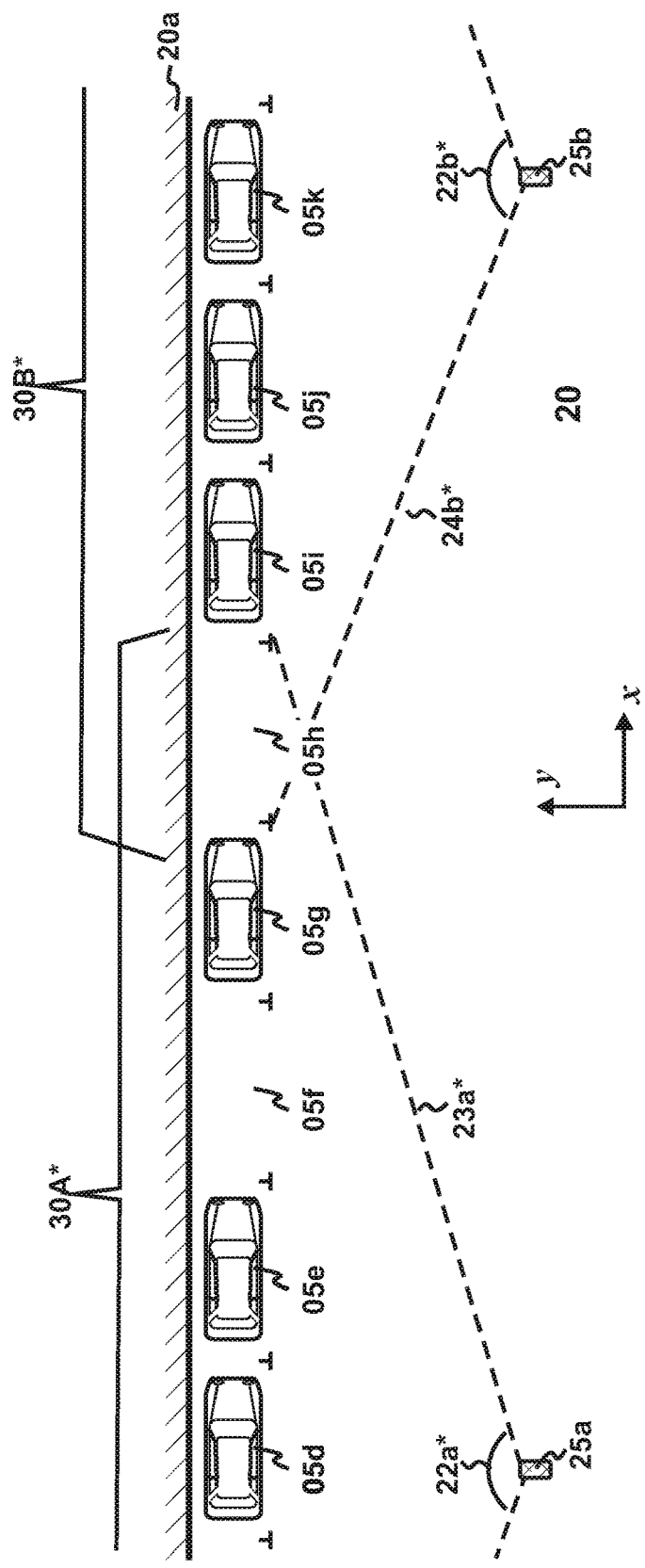
FIG. 2A is a top view of the city street monitored by a preferred coordinated parking-monitoring system.

Referring now to FIG. 2A, a preferred coordinated parking-monitoring system deployed in the city street 20 is disclosed. This coordinated parking-monitoring system comprises at least a co-monitored parking space 05h, which is monitored by two parking-monitoring devices 25a and 25b. The monitored group 30A\* of the parking-monitoring device 25a includes the parking spaces 05d, 05e, 5f, 05g, 05h, . . . , while the monitored group 30B\* of the parking-monitoring device 25b includes the parking spaces 05h, 05i, 05j, 05k, . . . . Compared with FIG. 1B, the parking space 05h, instead of the parking space 05g, becomes the rightmost parking space that can be monitored by the parking-monitoring device 25a. The view angle 22a\* of the parking-monitoring device 25a becomes larger and its right edge 23a\* extends to the parking space 05h. Likewise, the view angle 22b\* of the parking-monitoring device 25b also becomes larger and its left edge 24b\* extends to the parking space 05h. In the example disclosed in FIG. 1B and FIG. 2A, the total number of the parking spaces monitored by each parking-monitoring device 25a, 25b increases from seven to eight.

Figure 2B:
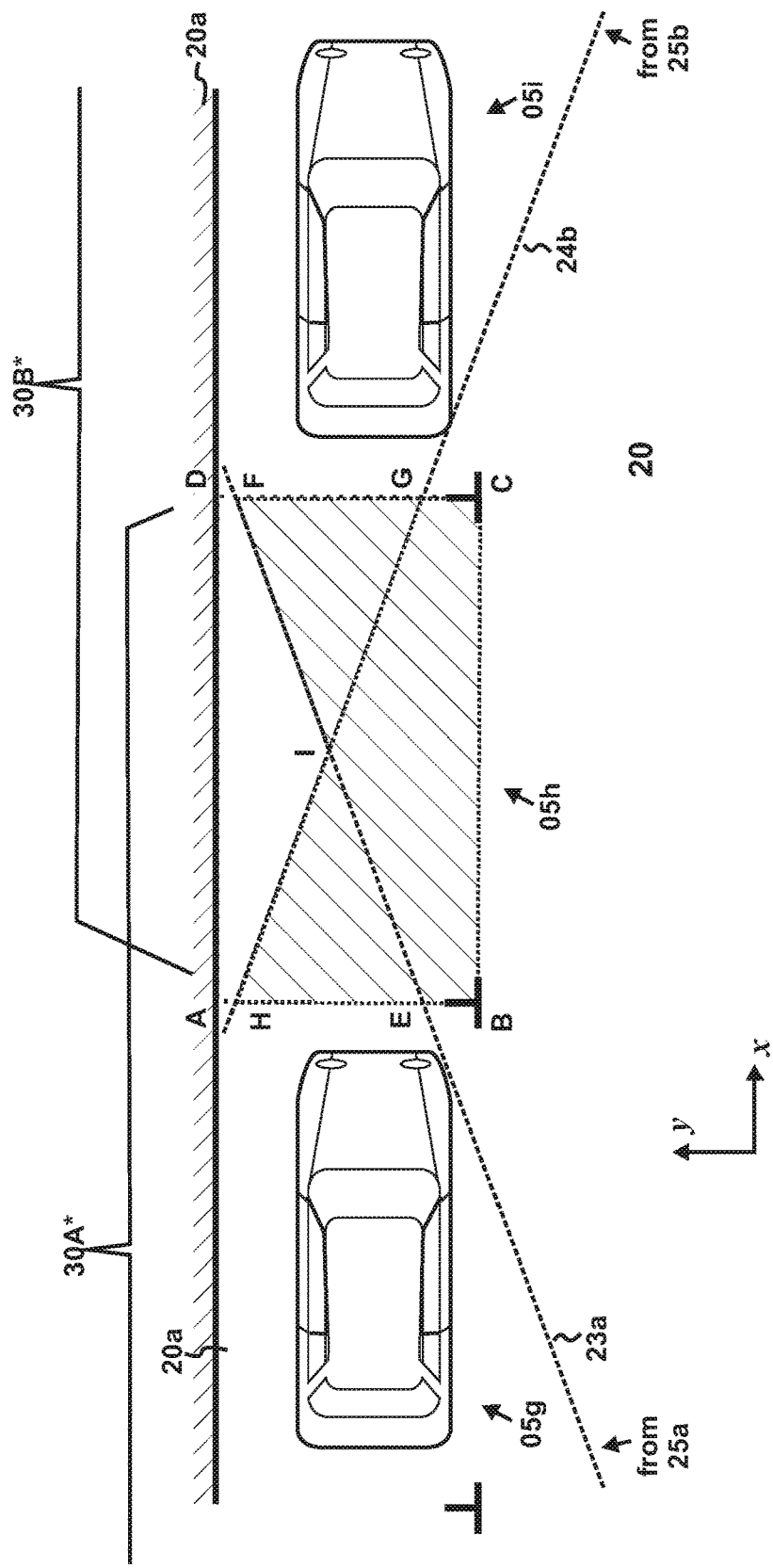
FIG. 2B illustrates the effective parking-monitoring area of a co-monitored parking space, which is monitored by two parking-monitoring devices.

FIG. 2B discloses more details of the parking spaces 05g, 05h, 05i near the border between the monitored groups 30A\* and 30B\*. For the co-monitored parking space 05h, the first effective parking-monitoring area for the first parking-monitoring device 25a is the area "EBCF", whereas the second effective parking-monitoring area for the second parking-monitoring device 25b is the area "HEI" (excluding the overlapped area between "HBCG" and "EBCF"). Because the parking space 05h is co-monitored by the parking-monitoring devices 25a and 25b, the total effective parking-monitoring area for the co-monitored parking space 05h is the sum of the areas "EBCF" and "HEI", which is shown in the shaded area "HBCFI". Accordingly, the total effective parking-monitoring area ratio, i.e. the ratio between the total effective parking-monitoring area ("HBCFI") and the total parking area ("ABCD"), becomes higher than the parking-determination threshold (e.g. 70%). Hence, the parking space 05h, although it cannot be reliably monitored by the parking-monitoring device 25a in prior arts, can be reliably monitored in the coordinated parking-monitoring system.

Figure 3A:
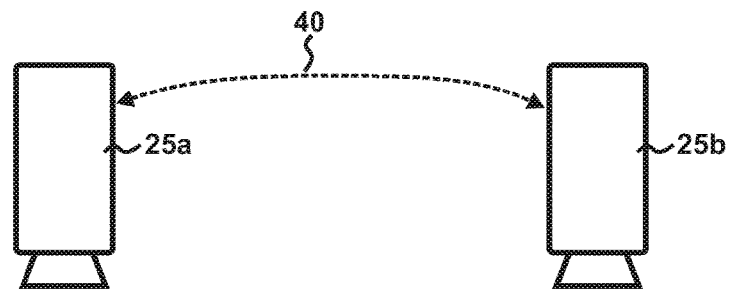
FIG. 3A is a block diagram of a preferred coordinated parking-monitoring system.
Figure 3B:
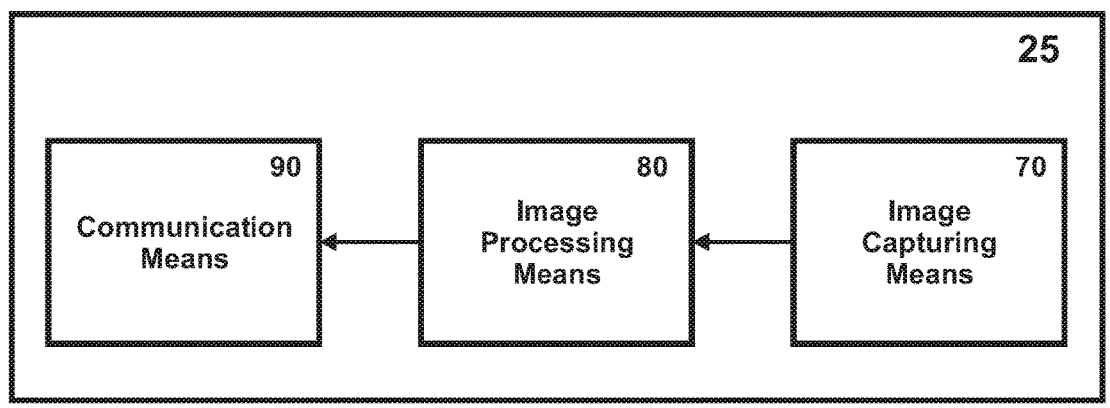
FIG. 3B is a block diagram of a preferred parking-monitoring device.

Referring now to FIGS. 3A-3B, a preferred coordinated parking-monitoring system is disclosed in FIG. 3A. It comprises a first parking-monitoring device 25a and a second parking-monitoring device 25b. The first parking-monitoring device 25a communicates information 40 with the second parking-monitoring device 25b. In one preferred embodiment, the communicated information 40 includes the images of the parking space 05h. In another preferred embodiment, the communicated information 40 includes the occupancy likelihood of the parking space 05h.

FIG. 3B is a block diagram of a preferred parking-monitoring device 25. It comprises an image-capturing means 70, an image-processing means 80 and a communication means 90. The image-capturing means 70 could comprise at least one camera. When it comprises multiple cameras, these cameras may face different directions in such a way that a large number of parking spaces can be monitored simultaneously. The image-processing means 80 could comprise a processor and a memory. The processor could be any type of central-processing unit (CPU), graphic-processing unit (GPU) and/or digital signal processor (DSP). The memory used by the parking-monitoring device could be any type of non-volatile memory (NVM, e.g. flash memory) or hard-disk drive (HDD). It could store an operating system of the parking-monitoring device. The communication means 90 could be Bluetooth, WiFi or cellular communication means.

Figure 4A:
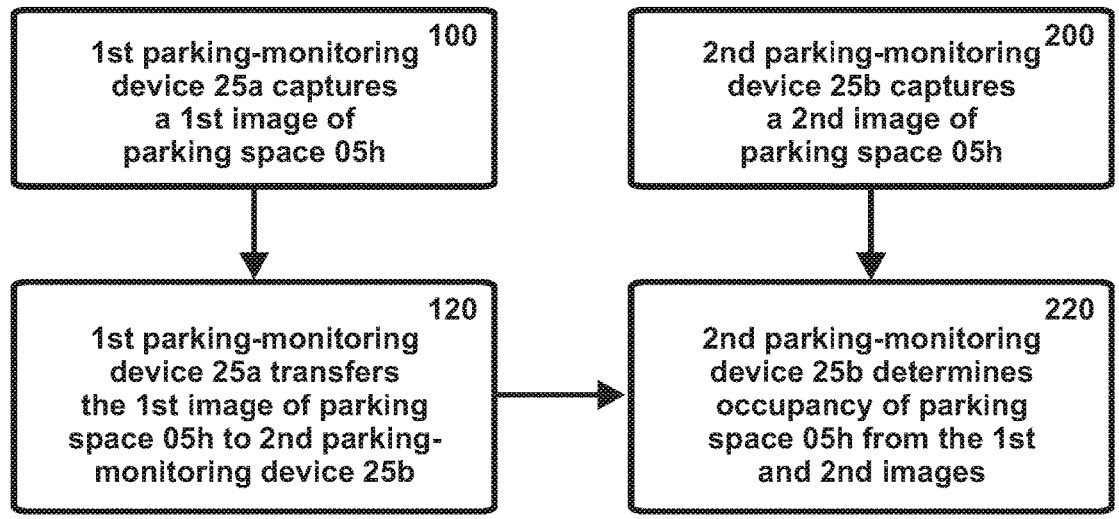
FIGS. 4A-4B are flow charts of two preferred coordinated parking-monitoring methods.
Figure 4B:
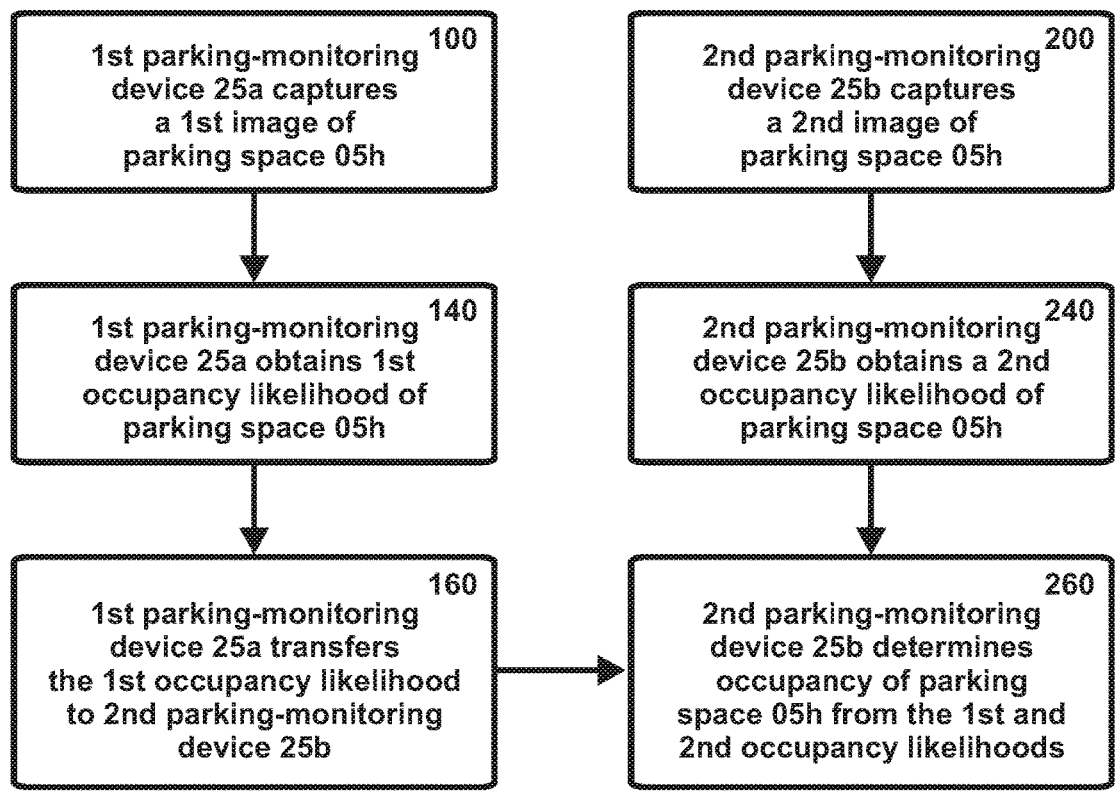

Referring now to FIGS. 4A-4B, two preferred coordinated parking-monitoring methods are disclosed. In the preferred method of FIG. 4A, the first parking-monitoring device 25a captures the images of a first plurality of parking spaces, including a first image of the parking space 05h (step 100). At the same time, the second parking-monitoring device 25b captures the images of a second plurality of parking spaces, including a second image of the parking space 05h (step 200). Then the first parking-monitoring device 25a transfers the first image of the parking space 05h to the second parking-monitoring device 25b (step 120). The second parking-monitoring device 25b determines the occupancy of the parking space 05h from the first and second images of the parking space 05h (step 220).

Figure 1C:
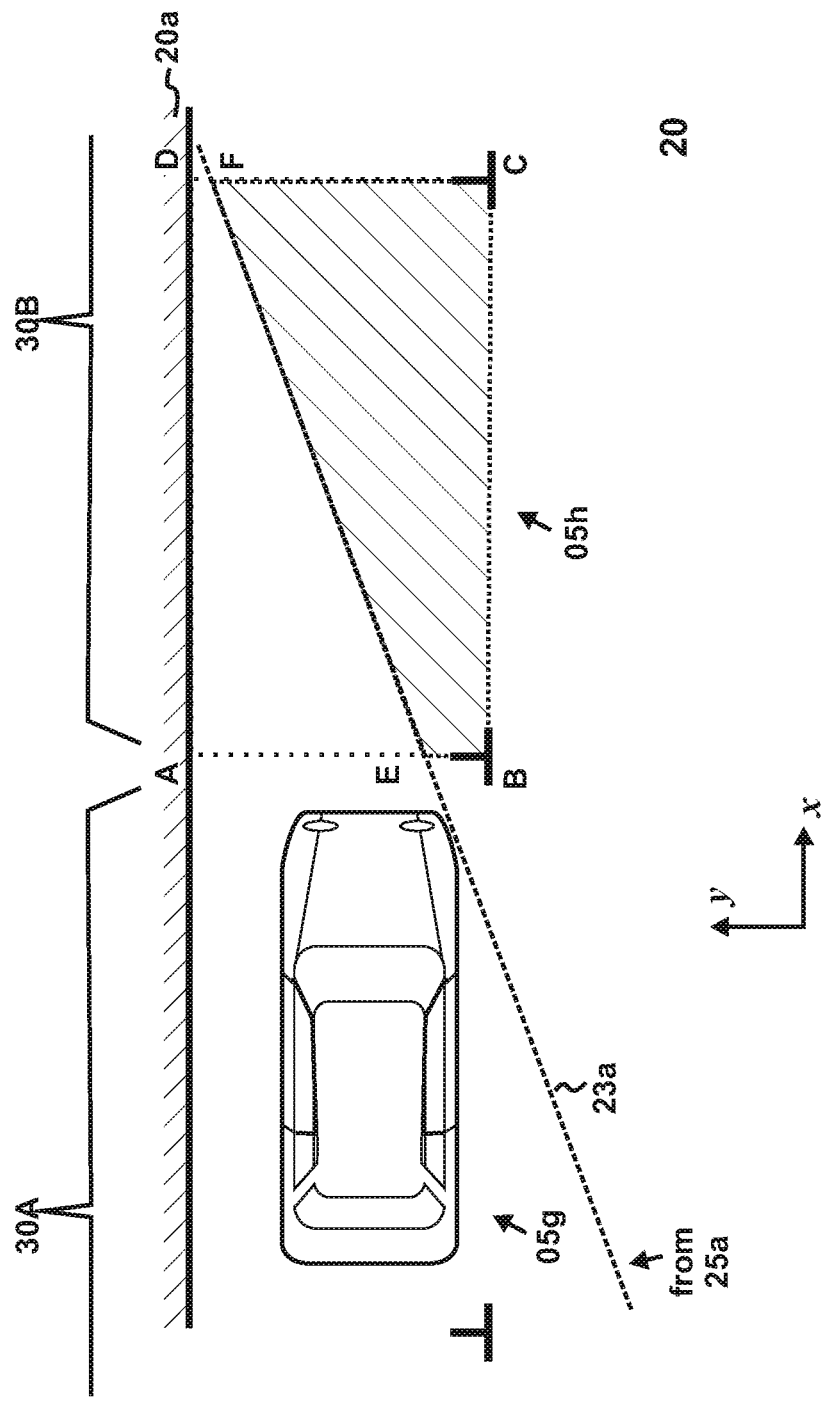
FIG. 1C illustrates the effective parking-monitoring area of a parking space monitored by a single parking-monitoring device (prior art).

FIG. 4B is a flow chart of a second preferred coordinated parking-monitoring method. The first parking-monitoring device 25a captures a first image of the parking space 05h (step 100), while the second parking-monitoring device 25b captures a second image of the parking space 05h (step 200). Afterwards, the first parking-monitoring device 25a does a preliminary processing on the first image of the parking space 05h. Because its first effective parking-monitoring ratio is below the parking-determination threshold from the perspective of the first parking-monitoring device 25a (FIG. 1C), this preliminary processing can only obtain a first occupancy likelihood for the parking space 05h (step 140). The first occupancy likelihood could be the ratio of the first changed area (i.e. the area within the first effective parking-monitoring area "EBCF" which has a background change) and the total parking area "ABCD". Similarly, a second occupancy likelihood can be calculated from the perspective of the second parking-monitoring device 25b (step 240). Then the first parking-monitoring device 25a transfers the first occupancy likelihood to the second parking-monitoring device 25b (step 160). The second parking-monitoring device 25b determines the occupancy of the parking space 05h from the first and second occupancy likelihoods (step 260). For example, the first occupancy likelihood is 0.6 and the second likelihood is 0.2, both of which are below the parking-determination threshold (0.7). The total occupancy likelihood is 0.8 (0.6+0.2), which is above the parking-determination threshold. A hard occupancy decision hereby can be made. Because only the first occupancy likelihood (no the first image) is transferred, a smaller communication bandwidth is required for the communication means 90.

While illustrative embodiments have been shown and described, it would be apparent to those skilled in the art that many more modifications than that have been mentioned above are possible without departing from the inventive concepts set forth therein. The invention, therefore, is not to be limited except in the spirit of the appended claims.

What is claimed is:

1. A coordinated parking-monitoring method, comprising the steps:

A) a first camera-based parking-monitoring device including a first camera obtains a first occupancy likelihood of a co-monitored parking space from a first image captured by said first camera;
B) a second camera-based parking-monitoring device including a second camera obtains a second occupancy likelihood of said co-monitored parking space from a second image captured by said second camera;
C) said first camera-based parking-monitoring device transfers said first occupancy likelihood of said co-monitored parking space to said second parking-monitoring device;
D) said second parking-monitoring device determines the parking occupancy of said co-monitored parking space from said first and second occupancy likelihoods.

2. The coordinated parking-monitoring method according to claim 1, wherein said first camera-based parking-monitoring device transfers said first occupancy likelihood to said second parking-monitoring device with at least a communication means.

3. The coordinated parking-monitoring method according to claim 2, wherein said communication means is a Bluetooth communication means.

4. The coordinated parking-monitoring method according to claim 2, wherein said communication means is a WiFi communication means.

5. The coordinated parking-monitoring method according to claim 2, wherein said communication means is a cellular communication means.

* * * * *